United States Patent
Fematt et al.

(10) Patent No.: US 10,306,865 B2
(45) Date of Patent: Jun. 4, 2019

(54) SOLENOID ACTUATED SHUTOFF VALVE

(71) Applicant: Technologies Holdings Corp., Houston, TX (US)

(72) Inventors: Rafael A. Fematt, Sugar Land, TX (US); Jacob R. Wilmott, Dundee, NY (US)

(73) Assignee: Technologies Holdings Corp., Houston, TX (US)

( * ) Notice: Subject to any disclaimer, the term of this patent is extended or adjusted under 35 U.S.C. 154(b) by 21 days.

(21) Appl. No.: 15/855,355

(22) Filed: Dec. 27, 2017

(65) Prior Publication Data

US 2018/0116164 A1    May 3, 2018

Related U.S. Application Data

(63) Continuation of application No. 15/134,434, filed on Apr. 21, 2016, now Pat. No. 9,901,068.

(51) Int. Cl.

| | |
|---|---|
| *A01J 5/01* | (2006.01) |
| *A01J 5/04* | (2006.01) |
| *F16K 31/06* | (2006.01) |
| *F16K 31/08* | (2006.01) |
| *F16K 51/02* | (2006.01) |

(52) U.S. Cl.
CPC ............ *A01J 5/048* (2013.01); *A01J 5/01* (2013.01); *A01J 5/044* (2013.01); *F16K 31/0675* (2013.01); *F16K 31/082* (2013.01); *F16K 51/02* (2013.01)

(58) Field of Classification Search
None
See application file for complete search history.

(56) References Cited

U.S. PATENT DOCUMENTS

| | | | |
|---|---|---|---|
| 3,212,751 | A | 10/1965 | Hassa |
| 3,789,798 | A | 2/1974 | Reisgies |
| 5,651,329 | A | 7/1997 | Van den Berg |
| 6,293,516 | B1 | 9/2001 | Parsons |
| 7,841,296 | B2 | 11/2010 | Brown |

(Continued)

FOREIGN PATENT DOCUMENTS

EP    0 221 733    10/1986

OTHER PUBLICATIONS

PCT Notification of Transmittal of the International Search Report and the Written Opinion of the International Searching Authority, or the Declaration, 14 pages, dated Aug. 3, 2017.

*Primary Examiner* — Marina A Tietjen
*Assistant Examiner* — Daphne M Barry
(74) *Attorney, Agent, or Firm* — Baker Botts L.L.P.

(57) ABSTRACT

A method for operating a valve, comprises directing fluid flow through a housing of the valve, wherein the fluid flows into the housing through a housing inlet and flows out of the housing through a housing outlet. The method continues by directing a first electric current into a solenoid coupled to the housing to generate a first magnetic field, wherein the first magnetic field exerts a force upon a plunger positioned inside the housing and causes the plunger to magnetically connect to a magnet. The method continues by directing a second electrical current into the solenoid to generate a second magnetic field, wherein the second magnetic field exerts a force upon the plunger causing the plunger to disconnect from the magnet and engage with the housing outlet. Fluid flows into the inlet through a milking hose, and fluid flows out of the outlet into a milking pipeline.

8 Claims, 3 Drawing Sheets

(56) References Cited

U.S. PATENT DOCUMENTS

| | | |
|---|---|---|
| 8,576,032 B2 | 11/2013 | Herbert |
| 2015/0090911 A1 | 4/2015 | Yun et al. |
| 2015/0337981 A1 | 11/2015 | Miller et al. |

SOLENOID ACTUATED SHUTOFF VALVE

RELATED APPLICATIONS

This application is a continuation of U.S. Ser. No. 15/134,434 filed Apr. 21, 2016 entitled "Solenoid Actuated Shutoff Valve" the entire disclosure of which is hereby incorporated by reference.

TECHNICAL FIELD OF THE INVENTION

This disclosure relates generally to fluid flow equipment and specifically to a solenoid actuated shutoff valve.

BACKGROUND OF THE INVENTION

Many industries use fluid flow systems to transport fluid from a source to a destination. For example, some industries need to transport fluids from a reservoir or well to a collection area. As the fluid flows from a source to its destination, the fluid flow system may need to regulate the flow of the fluid. For instance, in fluid flow systems where fluid flows from a reservoir to a collection area, the fluid flow system may need to stop the fluid flow if the collection area is full. Current approaches for regulating fluid flow are inefficient, ineffective, and break down easily.

SUMMARY OF THE INVENTION

A system comprising a milking hose having an opening for fluid to enter the hose, a milking pipeline with an internal air pressure, and a valve is disclosed. The valve comprises a housing, a solenoid, a magnet, a plunger, and a spring. The housing has an inlet coupled to the milking hose and an outlet coupled to the milking pipeline. Fluid flows from the milking hose into the housing through the inlet and flows out of the housing and into the pipeline through the outlet. The plunger comprises a stopper that is operable to engage with the outlet and a conductive portion that is operable to magnetically connect with the magnet. The spring is coupled to the plunger and operable to apply a spring force onto the stopper. Further, the solenoid is operable to receive electrical current flow. When the stopper is engaged with the outlet and the solenoid receives current for a certain period of time, the solenoid applies a magnetic force onto the plunger causing the stopper to disengage from the housing outlet. This causes the conductive portion of the plunger to move proximate to the magnet so that the conductive portion of the plunger magnetically connects with the magnet and the stopper remains disengaged from the housing outlet after the current no longer flows through the solenoid in the first direction. Conversely, when the conductive portion of the plunger is magnetically connected to the magnet and the solenoid receives a second current, the solenoid generates a magnetic field that causes the conductive portion of the plunger to detach from the magnet so that the stopper, acted upon by the spring force, engages with the housing outlet and remains engaged with the housing outlet even after the current no longer flows through the solenoid.

The present embodiment presents several technical advantages. For example, the present embodiment provides an energy efficient device for regulating the flow of fluid. It combines several different sources of energy to open and close a valve and regulate fluid flow through the valve. For example, in the present embodiment, bursts of electrical power instead of continuously running electrical power are used to generate magnetic fields that open and close the valve. Additionally, the present embodiment uses variances in air pressure and stored mechanical energy in a spring to open and close the valve.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
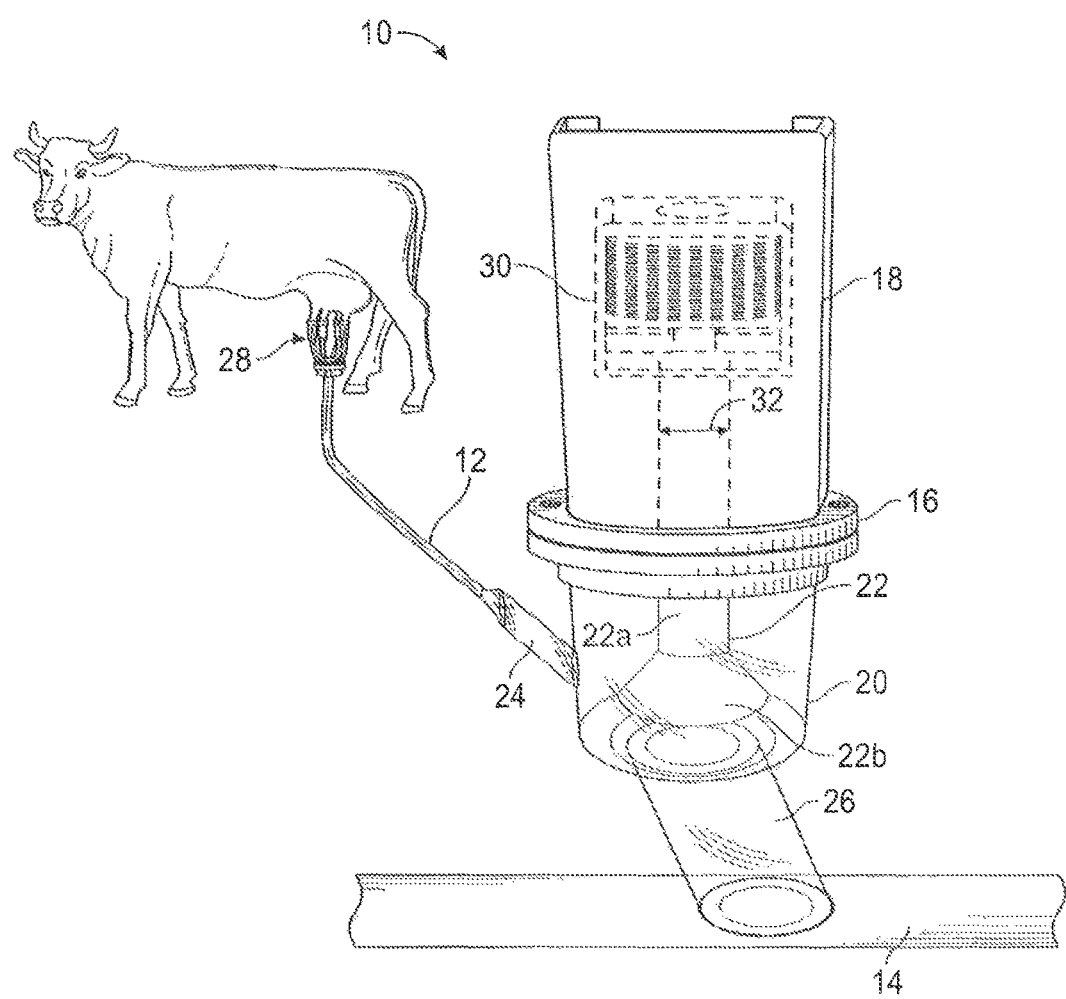
FIG. 1 illustrates a milk flow system comprising a solenoid actuated shutoff valve coupled to a milking hose and a milking pipeline.

In fluid flow systems that involve regulating the flow of fluid from a source to a destination, shutoff valves may be used to limit or stop the flow of fluid from a source to a destination. The shutoff valve may either allow fluid to flow through the valve or prevent fluid from flowing through the valve. One such shutoff valve is a solenoid actuated shutoff valve.

In a solenoid actuated shutoff valve, fluid flows unrestricted through the valve while the valve is in an "open" position and fluid flow through the valve is restricted when the valve is in a "closed" position. In one embodiment, the solenoid actuated shutoff valve has a solenoid and a plunger positioned inside a housing. When the valve is in an open position, fluid flows into the housing through an inlet in the housing and flows out of the housing through an outlet. When the valve is in a closed position, the plunger and solenoid close the housing outlet so that fluid flow through the housing is restricted or stopped. In its resting state, the valve is in a closed position and the plunger is engaged with the housing outlet. To open the valve, a current is applied to the solenoid. Electrifying the solenoid in this manner generates a magnetic field inside the solenoid. The magnetic field exerts a force upon the plunger causing the plunger to disengage and move away from the housing outlet. Once the plunger is disengaged from the outlet, the valve is in the open position and fluid can flow through the valve. To return the valve to the closed state, current flow through the solenoid is stopped. Once the current flow is stopped, the solenoid no longer applies a magnetic force upon the plunger and the plunger drops onto the outlet due to gravity and closes the outlet.

One disadvantage of using such solenoid actuated valves is that in fluid flow systems where large quantities of fluid flows through the shutoff valve, the solenoid actuated valve consumes a large amount of electrical power to keep the valve outlet in the open position. For example, in a milking system where milk flows from a dairy animal through a shutoff valve and into a milking pipeline, the shutoff valve may need to remain in the open position for up to 25 to 30 minutes at a time while the dairy animal is being milked. Additionally, the valve needs to allow for a significant amount of milk to flow through it during a milking session which requires the valve inlet and outlet to be large enough to accommodate high milk flow rates. Using a solenoid actuated valve to open a suitably sized outlet for a milking system requires, in some embodiments, a continuous flow of over 6 amperes of current through the solenoid. Maintaining a current that large across a solenoid for an extensive period of time consumes considerable power, especially when multiple shutoff valves are installed in one facility.

To address this issue, in one embodiment, the solenoid actuated shutoff valve includes a magnet and a spring. The magnet is positioned so that when the valve is in the open position, the plunger magnetically connects with the magnet and the magnet holds the plunger in place leaving the shutoff valve in the open position. In this manner, the solenoid does not need to continuously generate a magnetic field to exert a magnetic force onto the plunger. In addition, the plunger is coupled to a spring so that when the valve is disconnected from the magnet, the spring pushes the plunger toward the outlet and exerts a force onto the plunger to keep the plunger engaged with the outlet. Thus, in such an embodiment, the solenoid only needs to generate magnetic fields for short periods of time to magnetically connect or disconnect the plunger from the magnet.

Further, in some milking systems, the shutoff valve inlet is coupled to one end of a milking hose and the shutoff valve outlet is coupled to a milking pipeline. In such systems, the other end of the milking hose may be coupled to a milking claw. During milking, the milking claw is attached to a dairy animal's udder and milk flows from the dairy animal, through the milking claw and milking hose, into the shutoff valve and the milking pipeline. Little to no air enters the milking hose through the milking claw when the dairy animal is being milked because the claw is attached to the dairy animal's udder. However, once the milking claw is removed from the dairy animal after milking is complete, ambient air flows into the milking hose through the milking claw. This ambient air flows from the milking hose into the shutoff valve. When the shutoff valve is in the closed position, the air enters the shutoff valve but airflow from the shutoff valve into the milking pipeline is restricted. This causes the air pressure inside the shutoff valve to become higher than the air pressure inside the milking pipeline. This imbalance in air pressure causes the air pressure inside the shutoff valve to exert a force onto the plunger. This force, in addition to the force applied upon the plunger by the spring, further facilitates keeping the plunger in the closed position.

Figure 2:
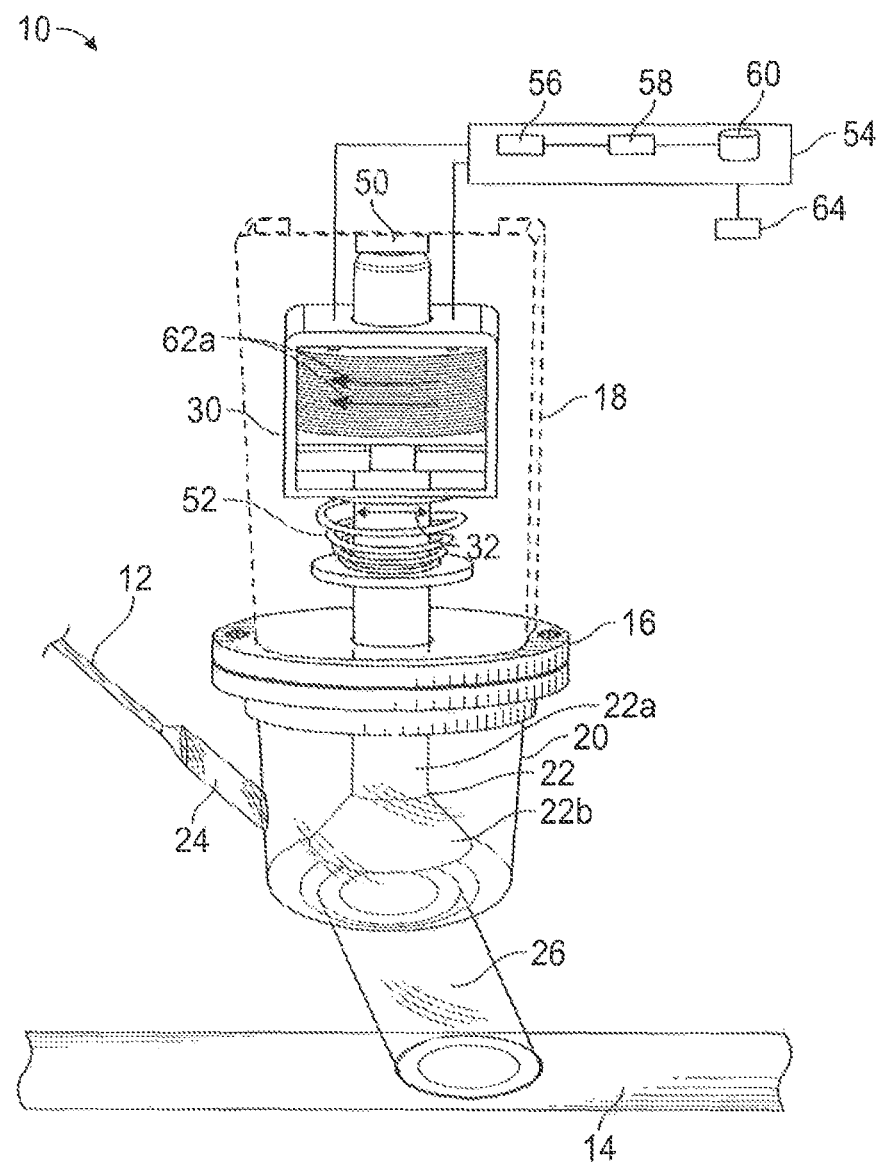
FIG. 2 illustrates a solenoid actuated shutoff valve in the open position.
Figure 3:
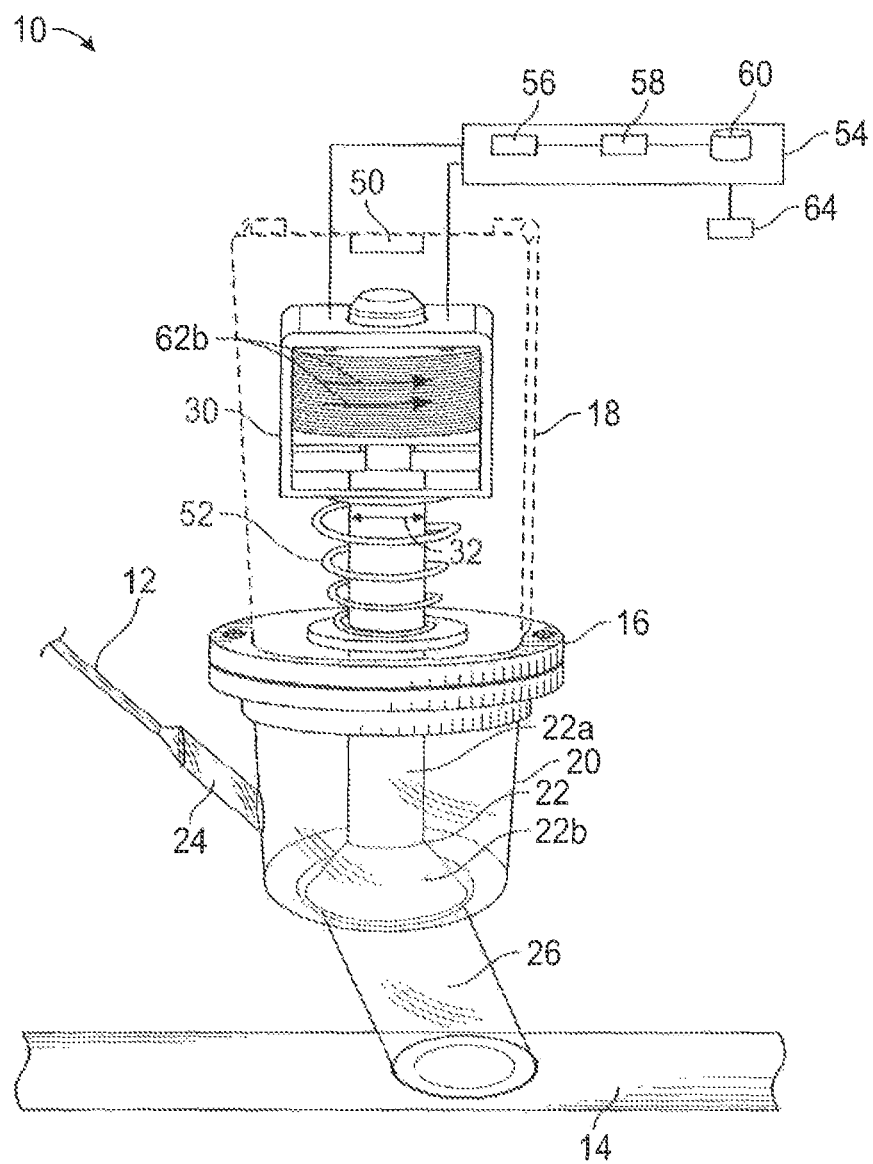
FIG. 3 illustrates a solenoid actuated shutoff valve in a closed position.

The present disclosure will be described in more detail using FIGS. 1 through 3. FIG. 1 illustrates a solenoid actuated shutoff valve coupled to a milking hose and a milking pipeline. FIG. 2 illustrates a cross-sectional view of a solenoid actuated shutoff valve in the "open" position. FIG. 3 illustrates a cross-sectional view of a solenoid actuated shutoff valve in a "closed" position. Although FIGS. 1-3 disclose a shutoff valve positioned as part of a milking system, in other embodiments, the shutoff valve may be part of any suitable fluid flow system including a system for transporting water, liquefied natural gas, oil, chemicals or any other fluid.

FIG. 1 illustrates a system 10 comprising a milking hose 12, a milking pipeline 14, and a shutoff valve 16. Shutoff valve 16 further comprises an enclosure 18, a housing 20, a plunger 22, and a solenoid 30. Housing 20 has an inlet 24 and an outlet 26. As shown, milking hose 12 is coupled to milking claw 28.

Milking hose 12 may be any pipe, hose, or conduit made of any suitable material including any suitable polymer, metal, or rubber. In various embodiments, milk and/or other suitable fluids flow through milking hose 12. Milking hose 12 may be of any suitable size. Milking hose 12 may be flexible or rigid. In various embodiments, in addition to being coupled to shutoff valve 16, milking hose 12 is also coupled to various different components of milking system 12 including milking claws 28, milk meters (not shown), milk-sensors (not shown) and/or other suitable devices.

Milking pipeline 14 may be any pipe, hose, or conduit made of any suitable material including any suitable polymer, metal, or rubber. In various embodiments, milk and/or other suitable fluids flow into and through milking pipeline 14. Milking pipeline 14 may be of any suitable size. Milking pipeline 14 may be flexible or rigid. In some embodiments, milking pipeline 14 is coupled to one or more shutoff valves 16 and milk flows into milking pipeline 14 through shutoff valve 16. Milking pipeline 14 may be designed so that air pressure inside milking pipeline 14 is relatively low. In such embodiments, any air that flows into milking pipeline 14 primarily flows into milking pipeline 14 through one or more outlets 26 and the rest of milking pipeline 14 is mostly airtight. System 10 may thus employ any suitable means to ensure that air pressure inside milking pipeline 14 is lower than air pressure outside milking pipeline 14.

In the illustrated embodiment of FIG. 1, shutoff valve 16 comprises an enclosure 18 coupled to housing 20. Enclosure 18 may be any compartment, box, or container that can enclose a solenoid 30. Enclosure 18 may be of any suitable size and may be made of any suitable material, including any polymer. In one embodiment, enclosure 18 has an opening or a hole where enclosure 18 couples with housing 20. The opening or hole may be positioned so that when plunger 22 is positioned inside housing 20, a portion of plunger 22 protrudes inside solenoid 30 that is positioned inside enclosure 18.

Housing 20 may be any container or conduit through which fluid, such as milk, may flow. Housing 20 is coupled to enclosure 18. In some embodiments, housing 20 is large enough that at least a portion of plunger 22 fits within housing 20. Housing 20 has an inlet 24 and an outlet 26. In some embodiments, inlet 24 is coupled to milking hose 12 and outlet 26 is coupled to milking pipeline 14. In various embodiments, inlet 24 and outlet 26 are large enough to allow for unimpeded fluid flow through housing 20. Inlet 24 may be the same size or a different size than outlet 26. In some embodiments, inlet 24 and outlet 26 may be anywhere from 0.5 inches in diameter to 1 inch in diameter.

Plunger 22 may be any device or apparatus that is operable to engage with outlet 26 to limit the flow of fluid through outlet 26. In one embodiment, plunger 22 has a top portion 22a and a bottom portion 22b. Top portion 22a of plunger 22 may be a rod made of any material that is responsive to a magnetic field. For example, top portion 22a may be made of a ferrous or other metallic material. Top portion 22a is sized so that it can fit inside solenoid 30. For example, in some embodiments, top portion 22a is substantially cylindrical and has a diameter that is smaller than the diameter of solenoid 30. In other embodiments, top portion 22a may be of any other suitable shape and may have other suitable dimensions that correspond to the dimensions of solenoid 30. Bottom portion 22b of plunger 22 is a stopper made of a substantially non-porous material such as a polymer or a rubber. The size of bottom portion 22b corresponds to the size of outlet 26. So, for example, in embodiments where outlet 26 is 0.5 inches, at least a part of bottom portion 22b is also greater than or equal to at least 0.5 inches so that at least part of bottom portion 22b engages with outlet 26 and restricts fluid flow into outlet 26. In some embodiments, bottom portion 22b forms a seal that limits fluid flow into outlet 26 when it engages with outlet 26.

Milking claw 28 may be any device or apparatus that can be attached to a dairy animal to facilitate the transportation of milk from the dairy animal to a container. Milking claw 28 may comprise one or more teat cups and liners for attaching milking claw 28 to the dairy animal's teats. Milking claw 28 has one or more openings through which milk and air flow into milking hose 12. In some embodiments, during milking, the teat cups and liners of milking claw 28 removably couple with the dairy animal's teats so that milk may flow from the dairy animal into the milking hose but little to no air flows into milking hose 12 through milking claw 28. Once milking is complete, however, air may begin to flow into milking hose 12 through milking claw 28.

Solenoid 30 comprises a conductive coil wound into a helix and has a hollow center. In one embodiment, solenoid 30 is substantially cylindrical and the inner diameter of solenoid 30 is larger than the diameter 32 of rod 22a of plunger 22. Solenoid 30 is connected to a power source and is operable to receive a current flow from the power source. When current flows across solenoid 30, solenoid 30 generates a magnetic field that flows through the hollow center of the solenoid in a direction that is substantially transverse to the direction of current flow. In some embodiments, plunger 22 is positioned inside shutoff valve 16 so that at least a portion of rod 22a of plunger 22 is positioned inside the hollow center of solenoid 30 and is affected by the magnetic field generated by solenoid 30.

In operation, milk flows from a dairy animal through milking claw 28 into milking hose 12 and shutoff valve 16. The milk may then flow from shutoff valve 16 into pipeline 14 if shutoff valve 16 is in the open position. To place shutoff valve 16 in the open position, an electrical current is directed into solenoid 30. The flow of electrical current causes solenoid 30 to generate a magnetic field which exerts a magnetic force onto plunger 22. The magnetic force causes plunger 22 to disengage from and open outlet 26. When outlet 26 is open, milk may flow from milking hose 12 into milking pipeline 14 through shutoff valve 16. Subsequently, outlet 26 is closed when plunger 22 drops onto outlet 26 and engages with outlet 26. When outlet 26 is closed, the flow of fluids such as milk through outlet 26 is restricted. Additionally, the flow of other fluids, such as air, through outlet 26, is also restricted.

Restricting the flow of air through outlet 26 causes air pressure inside shutoff valve 16 to become greater than air pressure inside milking pipeline 14. This imbalance in air pressure causes the air pressure inside shutoff valve 16 to exert a force onto plunger 22 when plunger 22 is engaged with outlet 26. This air pressure pushes plunger 22 onto outlet 26 and further facilitates keeping plunger 22 engaged with outlet 26. In this manner, the solenoid 30 actuated shutoff valve 16 is operable to regulate the flow of fluids, such as milk, through milking system 10.

FIG. 2 illustrates shutoff valve 16 in the open position showing enclosure 18, housing 20, plunger 22, inlet 24, outlet 26, and solenoid 30. This embodiment further illustrates a magnet 50, spring 52, and controller 54. In this embodiment, plunger 22 magnetically connects with magnet 50 when shutoff valve 16 is in the open position to keep plunger 22 disengaged from outlet 26. Further, spring 52 exerts force onto plunger 22 when shutoff valve 16 is in the closed position to keep plunger 22 engaged with outlet 26. Additionally, controller 54 regulates the flow of current 62a into solenoid 30.

Magnet 50 may be any device that generates a magnetic field. Magnet 50 may be a permanent magnet, an electromagnet, or any other suitable magnetic device. Magnet 50 may be coupled to one portion of enclosure 18 so that when shutoff valve 16 is in the open position, plunger 22 comes in proximity with and magnetically connects with magnet 50. For example, in the illustrated embodiment of FIG. 2, magnet 50 is magnetically connected to a top portion of enclosure 18. In this manner, when plunger 22 is magnetically connected to magnet 50, plunger 22 remains disengaged from outlet 26 without requiring solenoid 30 to continuously consume electrical power to generate a magnetic field.

Spring 52 may be any elastic device that stores mechanical energy when it is compressed and releases mechanical energy when it is decompressed. Spring 52 can be made of any suitable material including any metallic or non-metallic material. In one embodiment, spring 52 is a metallic wire formed into a helix or a coil. Spring 52 is coupled to plunger 22 such that spring 52 is more compressed when shutoff valve 16 is in the open position and less compressed when shutoff valve 16 is in the closed position. As such, spring 52 exerts a greater force onto plunger 22 when shutoff valve 16 is in the open position and plunger 22 is magnetically connected to magnet 50. Conversely, spring 52 exerts less force onto plunger 22 when shutoff valve 16 is in the closed position and plunger 22 is disconnected from magnet 50 and engaged with outlet 26. Spring 52 has a spring constant corresponding to the amount of energy stored by spring 52. Spring 52 may have any spring constant that is suitable for use in shutoff valve 16. For example, spring 52 may have a spring constant such that spring 52 facilitates keeping plunger 22 engaged with outlet 26 but is not so large that spring 52 disconnects plunger 22 from magnet 50 when shutoff valve 16 is in the open position and plunger 22 is magnetically connected to magnet 50.

Controller 54 may be any module operable to regulate the flow of current 62a into solenoid 30. Controller 54 may be coupled to any suitable power source 64 for providing current 62a to solenoid 30. In some embodiments, the power source 64 may be one or more capacitors and controller 54 may be coupled to the one or more capacitors. For example controller 54 may, in response to receiving a signal to open or close shutoff valve 16, discharge one or more capacitors coupled to solenoid 30. In some embodiments, controller 54 may regulate the current 62a flow into solenoid 30 by using an interface 56, a processor 58, and a memory 60.

Interface 56 represents any port or connection, real or virtual, including any suitable hardware and/or software, including protocol conversion and data processing capabilities, to communicate through a LAN, WAN, or other communication system that allows controller 54 to exchange information with any component of system 10. Interface 56 may be operable to receive information from and transmit information to the various components of system 10, including any milk meters, take-offs, automatic detachers, computers etc. Interface 56 may be operable to receive signals indicating whether to open or close shutoff valve 16. Interface 56 may also communicate with processor 58 and memory 60.

Processor 58 may be any electronic circuitry, including, but not limited to microprocessors, application specific integrated circuits (ASIC), application specific instruction set processor (ASIP), and/or state machines, that communicatively couples interface 56 and memory 60 and controls the operation of controller 54. In some embodiments, processor 58 may be single core or multi-core having a single chip containing two or more processing devices. Processor 58 may be 8-bit, 16-bit, 32-bit, 64-bit or of any other suitable architecture. Processor 58 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 58 may include other hardware and software that operates to control and process information. Processor 58 may execute computer-executable program instructions stored in memory 60. Processor 58 is not limited to a single processing device and may encompass multiple processing devices.

Memory 60 may include any one or a combination of volatile or non-volatile local or remote devices suitable for storing information. For example, memory 60 may include RAM, ROM, flash memory, magnetic storage devices, optical storage devices, network storage devices, cloud storage devices, solid state devices, or any other suitable information storage device or a combination of these devices. Memory 60 stores, either permanently or temporarily, data, operational software, other information for processor 58, other components of controller 54, or other components of system 10. For example, memory 60 may store user preferences or default settings for operating controller 54. Memory 60 may store information in one or more databases, file systems, tree structures, relational databases, any other suitable storage system, or any combination thereof. Furthermore, different information stored in memory 60 may use any of these storage systems. The information stored in memory 60 may be encrypted or unencrypted, compressed or uncompressed, and static or editable. Memory 60 may store information in one or more caches.

In operation, valve 16 may either be in an "open" position or a "closed" position. FIG. 2 illustrates valve 16 in the open position where bottom portion 22b of plunger 22 is disengaged from housing outlet 26 and top portion 22a of plunger 22 is magnetically connected to magnet 50. In this configuration, spring 52 is compressed and exerts a mechanical force upon plunger 22 pushing plunger 22 toward outlet 26. However, because magnet 50 is strong enough to generate an attractive force between magnet 50 and top portion 22a of plunger 22 that can overcome the mechanical force of compressed spring 52, spring 52 does not cause plunger 22 to become disconnected from magnet 50. Accordingly, bottom portion 22b remains disengaged from outlet 26 and valve 16 remains open.

To close valve 16, a current 62a flows into solenoid 30 in a first direction. The flow of current 62a through solenoid 30 results in solenoid 30 inducing a magnetic field in and around solenoid 30. When current 62a flows through solenoid 30, solenoid 30 generates a first magnetic field that is transverse to the direction of current 62a flow. This magnetic field counteracts the magnetic field generated by magnet 50 and causes plunger 22 to become detached from magnet 50. Once plunger 22 is detached from magnet 50, spring 52 pushes plunger 22 toward outlet 26 as spring 52 at least partially decompresses. Once plunger 22 engages with outlet 26, spring 52 continues to exert some force upon plunger 22 to facilitate keeping plunger 22 engaged with outlet 26.

Further, as explained above with respect to FIG. 1, when shutoff valve 16 of system 10 is in the closed position, air flows into shutoff valve 16 through inlet 24 but airflow into milking pipeline 14 through outlet 26 is restricted. This causes an imbalance of air pressure between the air pressure inside shutoff valve 16 and milking pipeline 14. This imbalance causes the air inside shutoff valve 16 to exert an additional force onto plunger 22 further facilitating coupling plunger 22 to outlet 26. In this manner, the air pressure and spring 52 force exerted upon plunger 22 allow valve 16 to remain closed even if current 62a only flows through solenoid 30 for a short period of time including time periods that are less than 10 seconds.

FIG. 3 illustrates the shutoff valve 16 of FIG. 2 in the closed position. In this embodiment, plunger 22 is disconnected from magnet 50 and bottom portion 22b of plunger 22 is engaged with outlet 26. As explained above with respect to FIGS. 1 and 2, valve 16 remains in the closed position because of gravity, the force exerted upon plunger 22 by spring 52, and the imbalanced air pressure inside housing 20 and milking pipeline 14.

To open valve 16, current 62b flows into solenoid 30 in a second direction that is substantially opposite the first direction of 62a. The flow of current 62b through solenoid 30 results in solenoid 30 inducing a second magnetic field in and around solenoid 30. The second magnetic field is substantially aligned with the magnetic field of magnet 50 and exerts a magnetic force upon plunger 22 in a direction that is substantially aligned with the magnetic force exerted upon plunger 22 by magnet 50. This second magnetic force is larger than the force exerted upon plunger 22 by the air pressure inside housing 20 and the force exerted upon plunger 22 by spring 52. The second magnetic force thus pushes plunger 22 away from outlet 26 and toward magnet 50. This causes bottom portion 22b of plunger 22 to disengage from outlet 26 and for top portion 22a of plunger 22 to magnetically connect with magnet 50. When plunger 22 is magnetically connected to magnet 50, spring 52 becomes compressed and exerts a mechanical force upon plunger 22 pushing plunger 22 toward outlet 26. However, because magnet 50 is strong enough to generate a magnetic field that can overcome the mechanical force of compressed spring 52, spring 52 does not cause plunger 22 to become disconnected from magnet 50. Accordingly, bottom portion 22b remains disengaged from outlet 26 and valve 16 remains open even after current 62b stops flowing through solenoid 30. Accordingly, valve 16 remains open even if current 62b only flows through solenoid 30 for a short period of time, such as less than 10 seconds, and valve 16 does not require a continuous flow of current 62b through solenoid 30 to remain open.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A method, comprising:
directing fluid flow through a housing of a valve, wherein the fluid flows into the housing through a housing inlet and flows out of the housing through a housing outlet;
directing a first electric current into a solenoid coupled to the housing to generate a first magnetic field, wherein the first magnetic field exerts a force upon a plunger positioned inside the housing and causes the plunger to magnetically connect to a magnet; and
directing a second electrical current into the solenoid to generate a second magnetic field, wherein the second magnetic field exerts a force upon the plunger causing the plunger to disconnect from the magnet and engage with the housing outlet;
wherein fluid flows into the inlet through a milking hose, fluid flows out of the outlet into a milking pipeline;
wherein internal air pressure of the milking pipeline is lower than air pressure in the housing and the higher pressure inside the housing applies a force onto the plunger to facilitate keeping the stopper engaged with the housing outlet.

2. The method of claim 1, wherein when the plunger is engaged with the housing outlet, air flows into the housing through the housing inlet and air does not flow out of the housing outlet.

3. The method of claim 1, wherein the plunger is further coupled to a spring and the spring is more compressed when the plunger is connected to the magnet and less compressed when the plunger is disconnected from the magnet.

4. The method of claim 3, wherein the spring applies a force onto the plunger to facilitate keeping the plunger engaged with the housing outlet when the plunger is disconnected from the magnet.

5. The method of claim 1, wherein a controller coupled to the solenoid directs electrical current flow based at least in part on receiving a signal to either open or close the valve.

6. The method of claim 1, wherein when the plunger is engaged with the outlet, airflow out of the outlet into the milking pipeline is restricted.

7. The method of claim 1, wherein the fluid that flows through the housing is milk.

8. The method of claim 1, wherein internal air pressure of the milking pipeline is lower than air pressure in the housing and the higher pressure inside the housing applies a force onto the stopper to facilitate keeping the stopper engaged with the housing outlet.

* * * * *